(12) United States Patent
Lioy et al.

(10) Patent No.: US 6,625,164 B1
(45) Date of Patent: Sep. 23, 2003

(54) SELECTIVELY FRAMING AND UNFRAMING PPP PACKETS DEPENDING ON NEGOTIATED OPTIONS ON THE $U_M$ AND $R_M$ INTERFACES

(75) Inventors: Marcello Lioy, San Diego, CA (US); Nischal Abrol, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/353,109

(22) Filed: Jul. 14, 1999

(51) Int. Cl.[7] ............................. H04J 3/22; H04L 12/56
(52) U.S. Cl. ........................................ 370/465; 370/401
(58) Field of Search .................. 370/389, 400–406, 370/465–467, 474

(56) References Cited

U.S. PATENT DOCUMENTS 5,802,465 A * 9/1998 Hamalainen et al. ....... 455/403
5,894,557 A * 4/1999 Bade et al. ............. 395/200.58
5,983,271 A * 11/1999 Alexander et al. .......... 709/227

FOREIGN PATENT DOCUMENTS

EP         0 494 576 A1    7/1992
WO         WO 96/21984     7/1996

* cited by examiner

*Primary Examiner*—Alpus H. Hsu
*Assistant Examiner*—Toan D. Nguyen
(74) *Attorney, Agent, or Firm*—Philip R. Wadsworth; Charles D. Brown; George C. Pappas (57) ABSTRACT

A wireless communication device and a method for transmitting and receiving at least one frame between a terminal device, connected to the wireless communication device, and an interworking function. Selected ones of a plurality of corresponding configuration options of a first and a second instance of a communication protocol, executing on the wireless communication device, are checked to determine whether they are equal. If the selected ones of the corresponding configuration options are equal, all but certain ones of a plurality of packets may be passed through the wireless communication device without unframing and reframing the communication protocol frames encapsulating the packets.

8 Claims, 6 Drawing Sheets

SELECTIVELY FRAMING AND UNFRAMING PPP PACKETS DEPENDING ON NEGOTIATED OPTIONS ON THE $U_M$ AND $R_M$ INTERFACES

BACKGROUND OF THE INVENTION

I. Field of the Invention

The present invention relates to the field of wireless data services. More particularly, the present invention relates to a novel and improved method and system for providing a wireless data communications protocol link between a terminal equipment (TE2) and an interworking function (IWF), through a wireless communication device (MT2).

II. Description of Related Art

Internetworking, i.e., the connection of individual local area networks (LANs), has rapidly become very popular. The infrastructure and associated protocols commonly referred to as the "Internet" have become well known and widely used. The Point-to-Point Protocol (PPP) is a common way to connect to the Internet, as is well known in the art, and further described in Request for Comment (RFC) 1661, The Point-to-Point Protocol (PPP), Network Working Group, dated July 1994, herein incorporated by reference. PPP provides a standard method for transporting multi-protocol datagrams over point-to-point links.

PPP includes three main components:

1. a method of encapsulating multi-protocol datagrams;
2. a Link Control Protocol (LCP) for establishing, configuring, and testing a data link connection; and
3. a family of Network Control Protocols (NCPs) for establishing and configuring different network-layer protocols.

Figure 1:
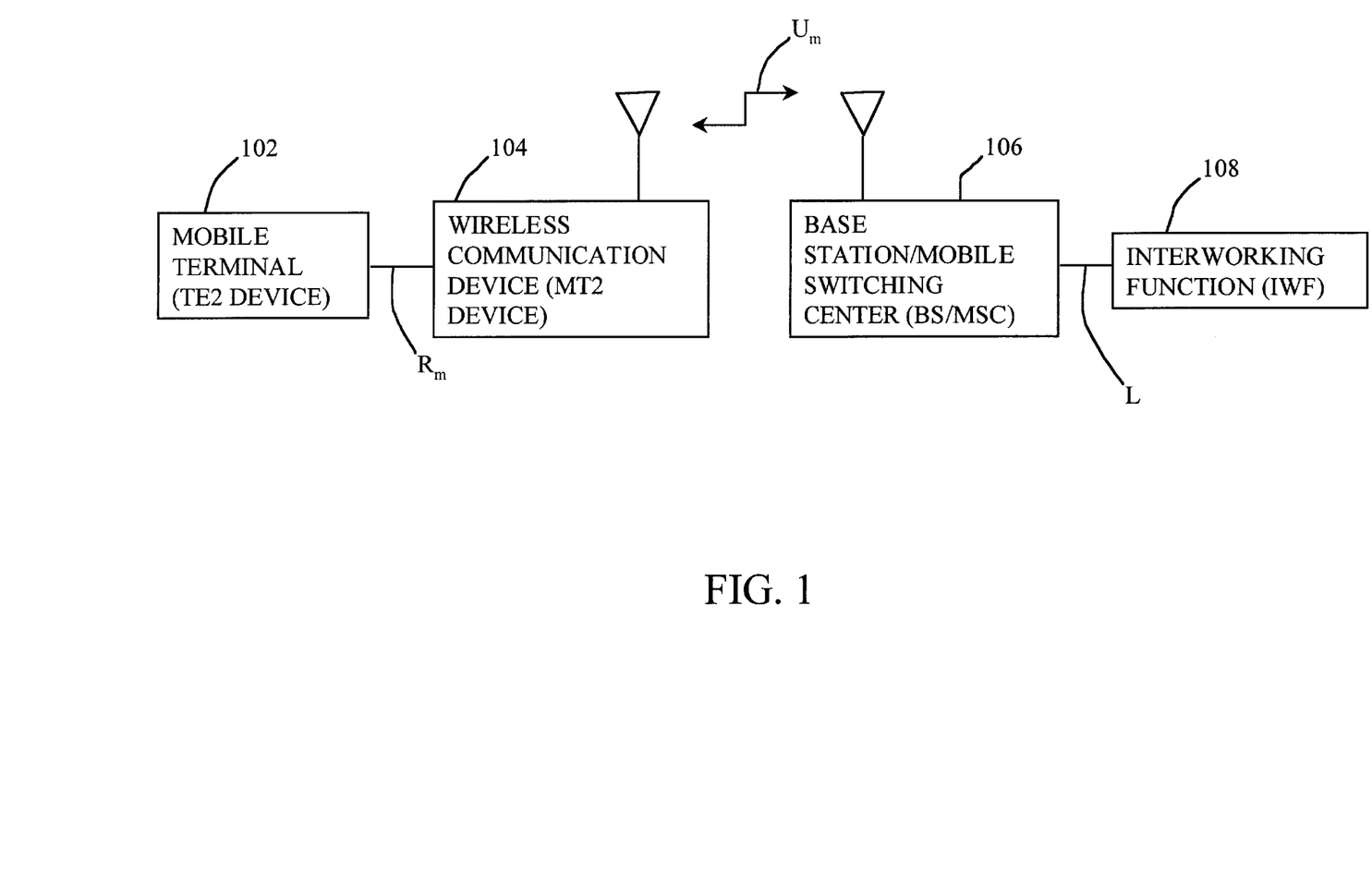
FIG. 1 illustrates a high-level block diagram of a wireless data communication system in which a terminal device connects to a network, such as the Internet, via a wireless communication device.

FIG. 1 illustrates a high-level block diagram of a wireless data communication system in which a mobile terminal (TE2 device) 102 communicates with an IWF 108 via a wireless communication system which includes a wireless communication device (MT2) 104 and Base Station/Mobile Switching Center (BS/MSC) 106. In FIG. 1, the IWF 108 serves as the access point to the Internet. IWF 108 is coupled to, and often co-located with BS/MSC 106, which may be a conventional wireless base station, as is known in the art. TE2 device 102 is coupled to MT2 device 104, which is in wireless communication with BS/MSC 106 and IWF 108.

Many protocols exist which allow data communication between the TE2 device 102 and the IWF 108. For example, Telecommunications Industry Association (TIA)/Electronics Industries Association (EIA) Interim Standard IS-707.5, entitled "Data Service Options for Wideband Spread Spectrum Systems: Packet Data Services," published February 1998, and herein incorporated by reference, defines requirements for support of packet data transmission capability on TIA/EIA IS-95 wideband spread spectrum systems, of which BS/MSC 106 and IWF 108 may be a part. IS-707.5 also provides the requirements for communication protocols on the links between the TE2 device 102 and the MT2 device 104 (the $R_m$ interface), between the MT2 device 104 and the BS/MSC 106 (the $U_m$ interface), and between the BS/MSC 106 and the IWF 108 (the L interface). IS-95 is defined in TIA/EIA IS-95, entitled "Mobile Station-Base Station Compatibility Standard for Dual-Mode Wideband Spread Spectrum Cellular System", published July 1993, herein incorporated by reference.

Figure 2:
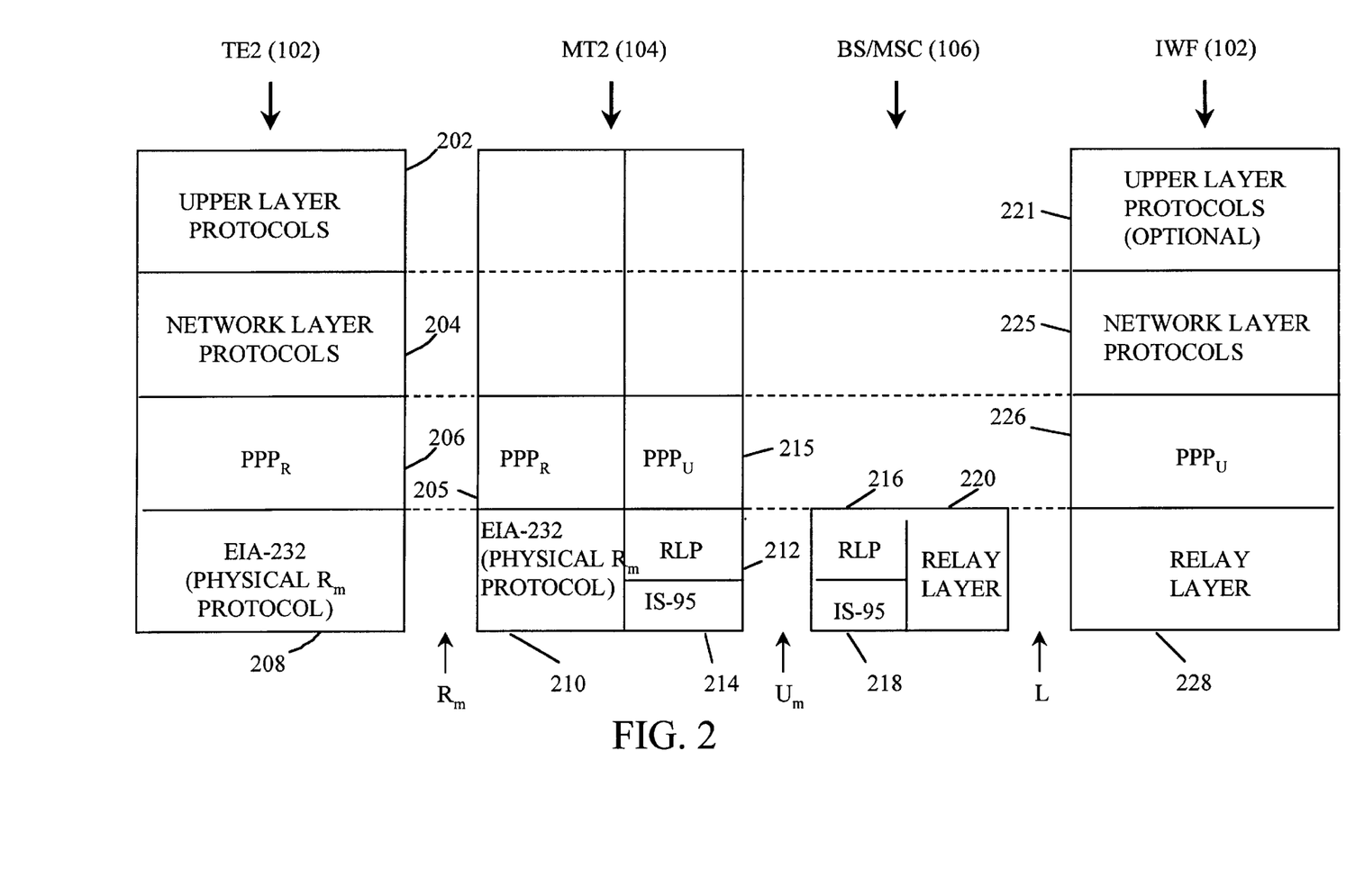
FIG. 2 is a diagram of the protocol stacks of each entity in the system.

Referring now to FIG. 2, a diagram of the protocol stacks in each entity of the IS-707.5 Relay Model is shown. FIG. 2 corresponds roughly to FIG. 1.4.2.2-1 of IS-707.5. At the far left of the figure is a protocol stack, shown in conventional vertical format, showing the protocol layers running on the TE2 device 102 (e.g., the mobile terminal, laptop or palmtop computer). The TE2 protocol stack is illustrated as being logically connected to the MT2device 104 protocol stack over the $R_m$ interface. The MT2 device 104, is illustrated as being logically connected to the BS/MSC 106 protocol stack over the $U_m$ interface. The BS/MSC 106 protocol stack is, in turn, illustrated as being logically connected to the IWF 108 protocol stack over the L interface.

As an example of the operation of the protocols of FIG. 2, the Point to Point Protocol ($PPP_R$) protocol 206 encodes packets from the upper layer protocols 202, 204 and transmits them across the $R_m$ interface using the EIA-232 protocol 208 to the EIA-232-compatible port on the MT2 device running the EIA-232 protocol 210. The EIA-232 protocol 210 on the MT2 device, receives the packets and passes them to the $PPP_R$ protocol 205. The $PPP_R$ protocol 205 unframes the packets encapsulated in PPP frames and typically, when a data connection is up, passes the packets to $PPP_U$ protocol 215, which frames the packets in PPP frames for transmission to a PPP peer protocol (226) located in the IWF (108). The Radio Link Protocol (RLP) 212 and IS-95 protocol 214, both of which are well known in the art, are used to transmit the packets, which are encapsulated in PPP frames, to the BS/MSC 106 over the $U_m$ interface. The RLP protocol 212 is defined in TIA/EIA IS-707.2, entitled "Data Service Options for Wideband Spread Spectrum Systems: Radio Link Protocol", February 1998, herein incorporated by reference, and the IS-95 protocol is defined in IS-95 mentioned above. A complementary RLP protocol 216 and IS-95 protocol 218 in the BS/MSC 106 pass the packets to the relay layer protocol 220 for transmission across the L interface to relay layer protocol 228. $PPP_U$ protocol 226 then unframes the received packets and passes them to the network layer protocols 225, which in turn passes them to upper layer protocols 221.

The EIA-232 protocol is defined in TIA/EIA-232-E Standard, entitled "Interface Between Data Terminal Equipment and Data Circuit-Terminating Equipment Employing Serial Binary Data Interchange", published October, 197, herein incorporated by reference.

The relay layer is defined in TIA/EIA IS-707.3, entitled "Data Service Options for Wideband Spread Spectrum Systems: AT Command Processing and the $R_m$ Interface", published February, 1998.

Note that instead of using the EIA-232 at 208 and 210, any other point-to-point physical protocol (e.g. USB) may be used.

As can be seen from the above explanation, unless a packet received in the MT2 device is to be passed to an upper layer protocol executing in the MT2 device, packets encapsulated in PPP frames are unframed from PPP frames only to be reframed in PPP frames for subsequent transmission to a PPP peer protocol, even when the packets require no further processing in the MT2 device. Consequently, processing resources and throughput are adversely affected by this unnecessary unframing and reframing of packets within PPP frames.

SUMMARY OF THE INVENTION

The present invention determines whether selected ones of the PPP LCP link options on the $R_m$ interface are identical to corresponding link options on the $U_m$ interface. If the selected ones of the PPP LCP link options on the two interfaces are equal, the present invention eliminates unnecessary unframing and reframing of PPP frames in the MT2 device. Thus, PPP frames may be received and transmitted by the MT2 device without unframing PPP frames, i.e., the PPP frames are merely passed through the MT2 device. As a result, the amount of processing required by the MT2 device decreases, thereby providing additional processing capability for greater data throughput.

If the present invention determines that the selected ones of the PPP link parameters on the two interfaces are not equal, then PPP frames are unframed and reframed as performed in prior art systems. Thus, when the present invention determines that the selected ones of the PPP link parameters are not equal, PPP frames will be unframed and reframed by the MT2 device, as described above.

BRIEF DESCRIPTION OF THE DRAWING

These and other advantages will become more apparent from the detailed description of the preferred embodiment along with the following drawings.

DETAILED DESCRIPTION OF THE PREFERRED EMBODIMENT

As is known in the art, in order to establish communications over a point-to-point link, Link Control Protocol (LCP) packets for establishing, configuring and testing the data link connection must be exchanged over each PPP link, i.e., the $R_m$ and $U_m$ interfaces. Any options not negotiated use a predefined default value, as specified by RFC 1661.

As described in RFC 1661, the LCP Packets comprise a Configure-Request, a Configure-Ack, a Configure-Nak, and a Configure-Reject. The format of these packets is well known and described in RFC 1661.

The Configure-Request packet is used to negotiate configuration options. All configuration options are always negotiated simultaneously.

The Configuration-Ack packet is transmitted if every configuration option in a received Configuration-Request packet is recognizable and all values are acceptable.

The Configure-Nak packet is sent in response to a Configuration-Request packet when the requested configuration options are recognizable, but some of the values are not acceptable. The Options field of the Configure-Nak packet are filled only with the unacceptable configuration options from the Configure-Request packet. Note that all configuration options are always Nak'd simultaneously.

The Configure-Reject packet is sent when a received Configure-Request includes configuration options that are unrecognizable or are not acceptable for negotiation. The options field of the Configure-Reject contains only the unacceptable configuration options from the Configure-Request.

The following comprises the well-known configuration options. The first six configuration options are described in RFC 1661, and defined for the PPP LCP protocol, while the seventh configuration option is defined in Request for Comment (RFC) 1662, PPP in HDLC-like Framing, Network Working Group, dated July 1994, herein incorporated by reference:

1. Maximum-Receive-Unit
2. Authentication-Protocol
3. Quality-Protocol
4. Magic-Number
5. Protocol-Field-Compression
6. Address-and-Control-Field-Compression, and
7. Async-Control-Character-Map.

Internet Protocol Control Protocol (IPCP) is a network control protocol responsible for configuring, enabling, and disabling Internet Protocol (IP) modules on both ends of the PPP link. IPCP is described in Request for Comment (RFC) 1332, "The PPP Internet Protocol Control Protocol (IPCP)", G. McGregor Merit, Network Working Group, May, 1992, herein incorporated by reference. IPCP configuration options include:

1. IP-Addresses;
2. IP-Compression-Protocol; and
3. IP-Address

IPCP uses the same option negotiation mechanism as the Link Control Protocol (LCP).

Configuration option negotiations occur separately for both the $R_m$ interface and the $U_m$ interface. As described in RFC 1661, the Configuration-Ack packet contains a list of the options which the sender is acknowledging. The MT2 device monitors received and transmitted Configuration-Ack packets over the $R_m$ and $U_m$ interfaces and stores the value of each option in a storage device, such as a computer memory. All configuration options have default values, defined by RFC 1661, which are used when the corresponding configuration option is not negotiated.

When selected ones of the configuration options of both the $R_m$ and the $U_m$ interfaces are, respectively, equal, certain ones of PPP frames received by the MT2 device over one of the $R_m$ and the $U_m$ interfaces are transmitted by the MT2 device over the other of the $R_m$ and the $U_m$ interfaces without unframing the PPP frame by one of the $PPP_R$ 205 interface and the $PPP_U$ 215 interface and without reframing the PPP frame by the other of the $PPP_R$ 205 interface and the $PPP_U$ 215 interface. This is referred to as "pseudo network mode". When all the packets require unframing and reframing, this is referred to as "full network mode."

Figure 3:
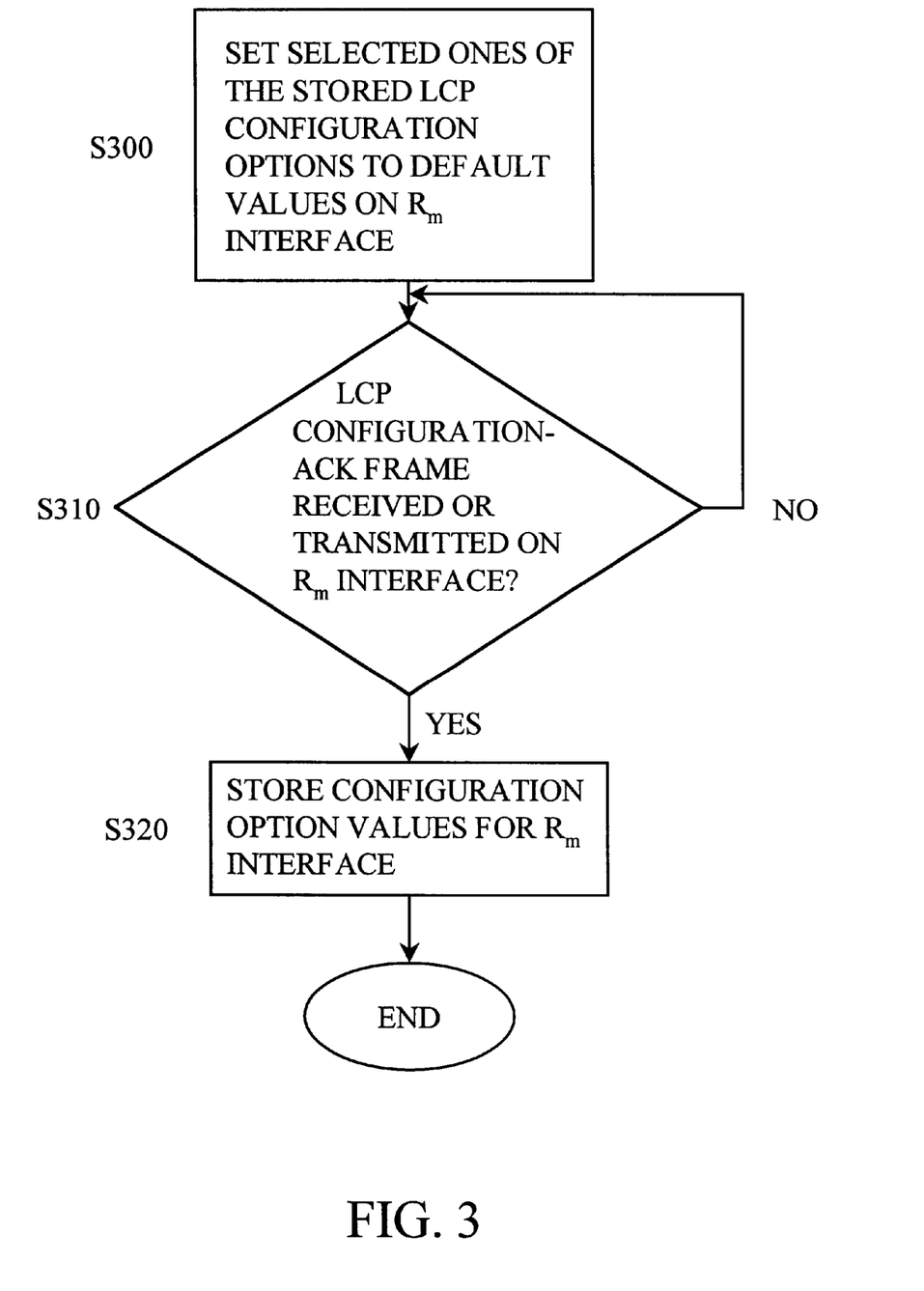
FIG. 3 is a flowchart showing the processing that occurs for monitoring the PPP $R_m$ interface and storing the negotiated configuration options.

FIG. 3 shows a flowchart of a process for monitoring and storing the negotiated LCP configuration options of the $R_m$ interface. The process executes, for example, in software or firmware running on a processor within the MT2 device.

In step S300, the stored configuration options for the $R_m$ interface, which are saved in a memory device, such as RAM included in the MT2device, are initialized to their default values, as defined by RFC 1661. In step S310, a received or an about-to-be-transmitted frame on the $R_m$ interface is checked to determine whether the frame contains an LCP Configuration-Ack packet. If the frame contains an LCP Configuration-Ack packet, step S320 is performed to save the values of the negotiated options, included in the Configuration-Ack packet, into the memory. Thus, those options successfully negotiated are stored in the memory and those options not negotiated have default settings stored in the memory device. If the received or about-to-be-transmitted packet is not an LCP Configuration-Ack packet, the process ignores the packet and waits for the next received or about-to-be-transmitted PPP frame.

Figure 4:
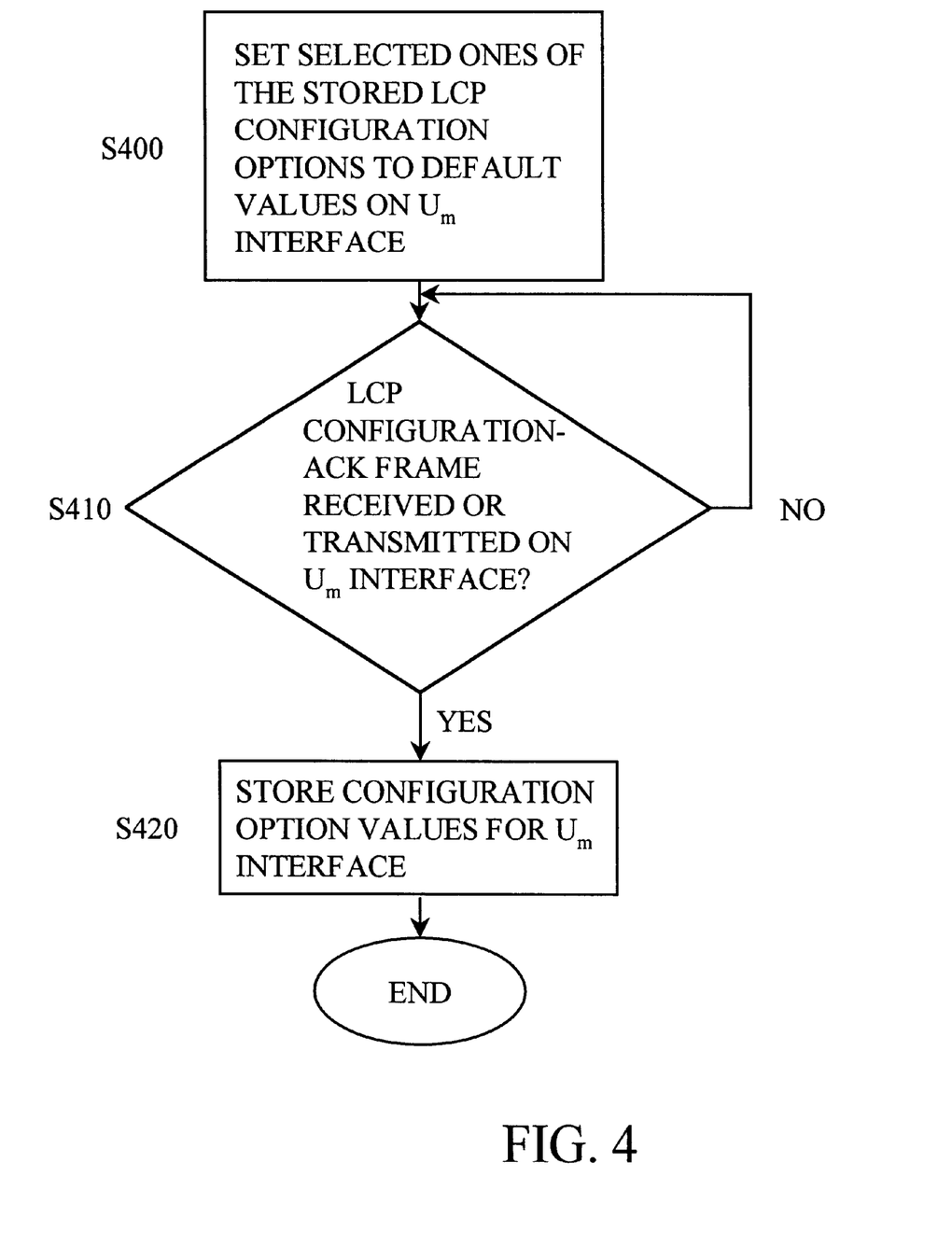
FIG. 4 is a flowchart showing the processing that occurs for monitoring the PPP $U_m$ interface and storing the negotiated configuration options.

FIG. 4 shows a flowchart of a process for monitoring and storing the negotiated LCP configuration options on the $U_m$ interface. The process is similar to that shown in FIG. 3, but instead packets received or about-to-be-transmitted over the $U_m$ interface are monitored.

In step S400, the stored configuration options for the $U_m$ interface, which are saved in a memory device, such as RAM included in the MT2device, are initialized to their default values, as defined by RFC 1661. In step 410, a received or about-to-be-transmitted frame on the $U_m$ interface is checked to determine whether the frame contains an LCP Configuration-Ack packet. If the frame contains an LCP Configuration-Ack packet, step S420 is performed to save the values of the negotiated options, included in the Configuration-Ack packet, into the memory. Thus, those options successfully negotiated are stored in the memory and those options not negotiated have default settings stored in the memory device. If the frame received or about-to-be-transmitted does not include an LCP Configuration-Ack packet, the process ignores the packet and waits for the next received or about-to-be-transmitted PPP frame.

Figure 5:
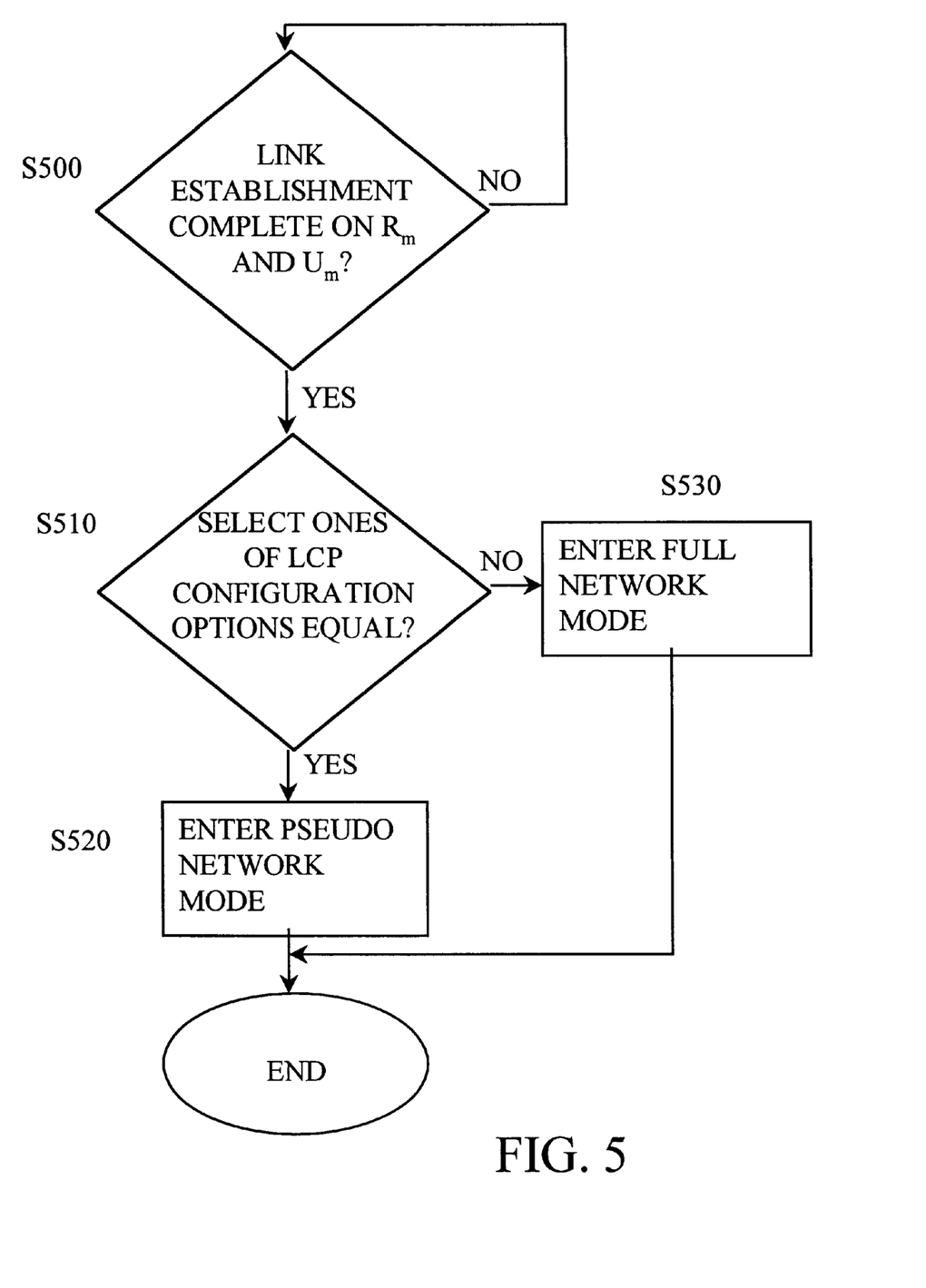
FIG. 5 is a flowchart illustrating a process for determining whether the MT2 device is to operate in full network mode or pseudo network mode.

FIG. 5 is a flowchart for a procedure which executes on a processor within the MT2 device. Step S500 determines whether link establishment is complete on both the $U_m$ and $R_m$ interfaces. This can be determined by examining a link state variable separately maintained for the $PPP_R$ link 205 and the $PPP_U$ link 215. RFC 1661 explains the link states, which are well known in the art, for the PPP link. Step S500 determines whether the link states of both the $PPP_R$ 205 and the $PPP_U$ 215 links are in the Network state, indicating that the PPP links are established. If step S500 determines that both PPP links are established, then step S510 is performed to determine whether corresponding selected ones of the LCP configuration options are equal on the $R_m$ and $U_m$ interfaces. In the preferred embodiment, the selected options include Protocol-Field-Compression and Address-and-Control-Field Compression. However, step S510 may be adjusted to compare any configuration options. If the corresponding selected ones of the LCP configuration options are equal, step S520 is performed to indicate that the MT2 device is in pseudo network node, otherwise, step S530 is performed to indicate that the MT2 device is in full network mode.

Figure 6:
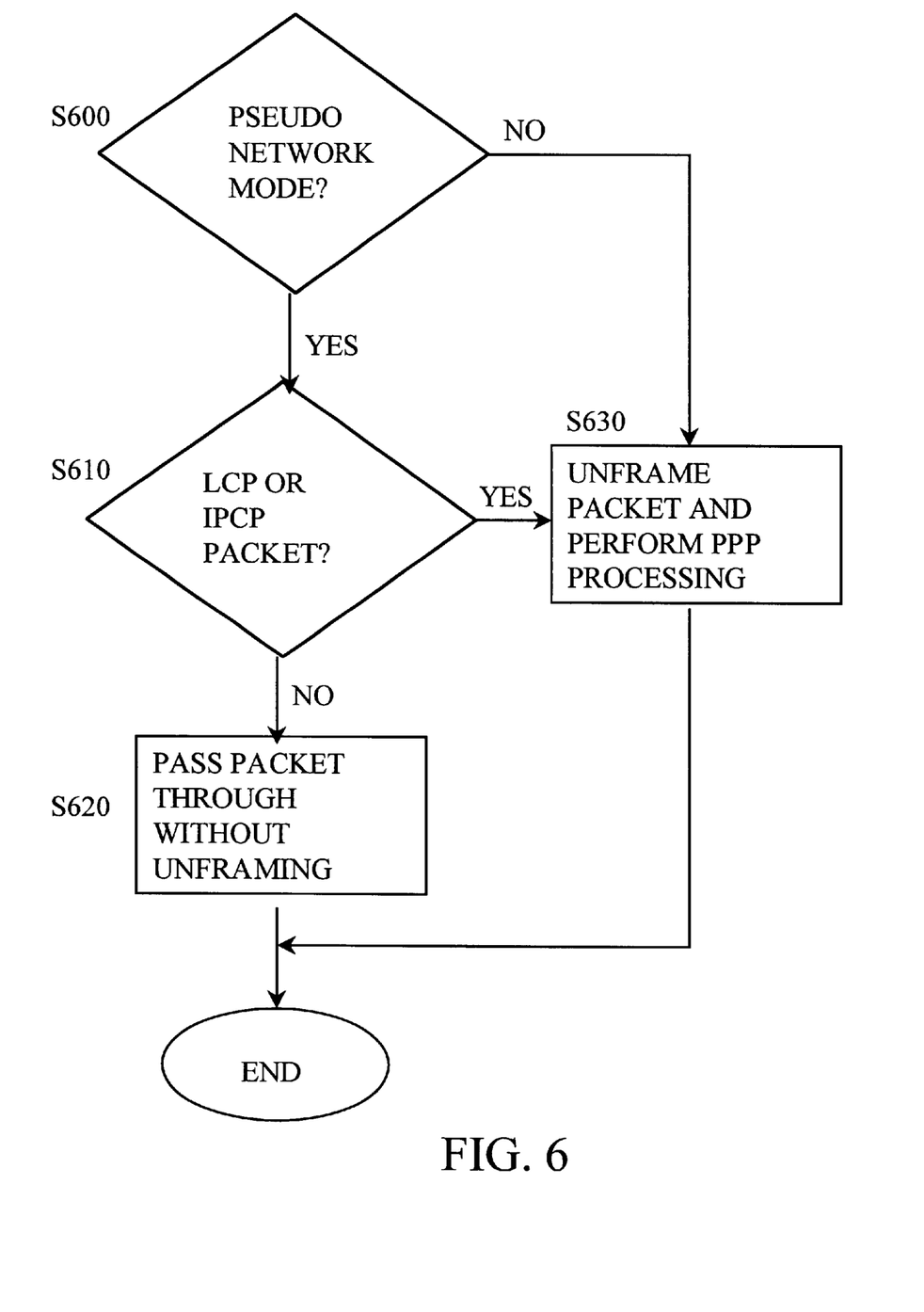
FIG. 6 is a flowchart showing the processing for determining whether a packet within a PPP frame requires unframing.

FIG. 6 illustrates the processing that is performed in the MT2 device when PPP frames are received on either the $R_m$ or the $U_m$ interfaces while the PPP link is established, i.e., in the network state.

In step S600, a check is performed to determine if the MT2 device is operating in pseudo network mode or full network mode. If the MT2 device is operating in pseudo network mode, step S610 is performed to determine whether the received PPP frame from either the $R_m$ or the $U_m$ interfaces includes an LCP or an IPCP packet. If the received PPP frame does not include an LCP or IPCP packet, then step S620 is executed to pass the packet through the MT2 device without unframing and reframing the packet. In other words, if the received PPP frame arrived on the $R_m$ interface, step S620 causes the PPP frame to be transmitted over the $U_m$ interface without unframing the PPP frame and reframing the PPP frame. If the received PPP frame arrived over the $U_m$ interface, step S620 causes the PPP frame to be transmitted over the $R_m$ interface without unframing and reframing the PPP frame.

If step S600 determines that the MT2 device is not operating in pseudo network mode (i.e., the MT2 device is operating in full network mode), or step S610 determines that the received PPP frame includes either an LCP packet or an IPCP packet, then unframing and reframing may be performed. In other words, when the MT2 device receives a PPP frame on the $R_m$ interface and the MT2 is in full network mode or the MT2 device is in pseudo network mode, but either an LCP packet or an IPCP packet is included in the PPP frame, then the frame will be processed by the $PPP_R$ protocol 205, which will unframe the packet and the packet may eventually be passed to the $PPP_U$ protocol 215, where it will be reframed in a PPP frame for transmission over the $U_m$ interface. Similarly, when the MT2 device receives a PPP frame on the $U_m$ interface and the MT2 is in full network mode or the MT2 device is in pseudo network mode, but either an LCP packet or an IPCP packet is included in the PPP frame, then the frame will be processed by the $PPP_U$ protocol 215, which will unframe the packet and the packet may be eventually be passed to the $PPP_R$ protocol 205, where it will be reframed in a PPP frame for transmission over the $R_m$ interface.

Although, the preferred embodiment shows only LCP and IPCP packets being unframed and reframed in pseudo network mode, the invention may be adjusted to cause any particular type of packet or no packet at all to be unframed and reframed in PPP frames while in pseudo network mode.

While this invention has been described in connection with what is presently considered to be the preferred embodiment, it is to be understood that the invention is not limited to the disclosed embodiment, but on the contrary, is intended to cover various modifications and equivalent arrangements included within the spirit and scope of the appended claims.

We claim as our invention:

1. A method of passing incoming frames, intended for exchange between a first device and a second device, within a wireless communication device using PPP communication protocol, comprising:

identifying first corresponding PPP protocol configuration options as negotiated between the first device and the wireless communication device along a Um interface;

identifying second PPP corresponding protocol configuration options as negotiated between the wireless communication device and the second device along an Rm interface;

identifying when the first and second identified corresponding PPP protocol configuration options are equal;

identifying whether the incoming frames are of a predetermined type; and when the, first and second identified corresponding PPP configuration options are equal and the incoming frames are of a predetermined type, passing, in response thereto, the incoming frames between the first and second devices by the wireless communication device without performing unframing and reframing of the incoming frames by the wireless communication device.

2. The method of claim 1, wherein the corresponding PPP protocol configuration options associated with the incoming frames include Async-Control-Character-Map.

3. The method of claim 1, wherein the corresponding PPP protocol configuration options associated with the incoming frames include Protocol-Field-Compression.

4. The method of claim 1, wherein the corresponding PPP protocol configuration options associated with the incoming frames include Address-and-Control-Field-Compression.

5. A wireless communication device for passing incoming frames between a first device and a second device using PPP communication protocol, comprising:

means for identifying first corresponding PPP protocol configuration options as negotiated between the first device and the wireless communication device along a Um interface;

means for identifying second corresponding PPP protocol configuration options as negotiated between the wireless communication device and the second device along an Rm interface;

means for identifying when the first and second identified corresponding PPP protocol configuration options are equal;

means for identifying whether the incoming frames are of a predetermined type; and when the first and second identified corresponding PPP configuration options are equal and the incoming frames are of a predetermined type, means for passing, in response there to, the incoming frames between the first and second devices without performing unframing and reframing of the incoming frames.

6. The wireless communication device of claim 5, wherein the corresponding PPP protocol configuration options associated with the incoming frames include Async-Control-Character-Map.

7. The wireless communication device of claim 5, wherein the corresponding PPP protocol configuration options associated with the incoming frames include Protocol-Field-Compression.

8. The wireless communication device of claim 5, wherein the corresponding PPP protocol configuration options associated with the incoming frames include Address-and-Control-Field-Compression.

* * * * *